(12) United States Patent
Johnson et al.

(10) Patent No.: US 7,113,487 B1
(45) Date of Patent: Sep. 26, 2006

(54) FORWARDING CONTROL PROTOCOL

(75) Inventors: Erik J. Johnson, Portland, OR (US); Bernie N. Keany, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/546,633

(22) Filed: Apr. 7, 2000

(51) Int. Cl.
*H04L 12/28* (2006.01)
(52) U.S. Cl. .................................. 370/255; 370/389
(58) Field of Classification Search ................ 370/236, 370/255, 256, 389, 392, 396, 395.3, 395.31, 370/400, 408, 466, 467, 469
See application file for complete search history.

(56) References Cited

U.S. PATENT DOCUMENTS

| | | | | |
|---|---|---|---|---|
| 5,566,170 A | * | 10/1996 | Bakke et al. | 370/392 |
| 5,920,699 A | * | 7/1999 | Bare | 709/225 |
| 5,920,705 A | * | 7/1999 | Lyon et al. | 709/240 |
| 6,141,705 A | * | 10/2000 | Anand et al. | 710/15 |
| 6,154,743 A | * | 11/2000 | Leung et al. | 707/10 |
| 6,301,229 B1 | * | 10/2001 | Araujo et al. | 370/252 |
| 6,370,599 B1 | * | 4/2002 | Anand et al. | 710/15 |
| 6,389,480 B1 | * | 5/2002 | Kotzur et al. | 370/400 |
| 6,396,815 B1 | * | 5/2002 | Greaves et al. | 370/256 |
| 6,424,659 B1 | * | 7/2002 | Viswanadham et al. | 370/469 |
| 6,553,028 B1 | * | 4/2003 | Tang et al. | 370/389 |
| 6,556,541 B1 | * | 4/2003 | Bare | 370/235 |
| 2002/0196802 A1 | * | 12/2002 | Sakov et al. | 370/432 |
| 2003/0078974 A1 | * | 4/2003 | Grayson et al. | 709/205 |

OTHER PUBLICATIONS

Ferinacci et al., "Generic Routing Encapsulation (GRE)", http://www.faqs.org/rfcs/rfc2784.html.
Kent et al., "Security Architecture for the Internet Protocol", http://www.faqs.org/rfcs/rfc2401.htm.
Stevens, "Remote Procedure Calls", UNIX Netowrk Programming vol. 2, Second Edition, 355-452.
Townsley, "Layer Two Tunneling Protocol L2TP;" http://www.faqs.org/rfcs/rfc2661.html.

* cited by examiner

*Primary Examiner*—Chi Pham
*Assistant Examiner*—Anh-Vu Ly
(74) *Attorney, Agent, or Firm*—Fish & Richardson P.C.

(57) ABSTRACT

A forwarding element capable of forwarding protocol control information in an encapsulated form to a separate control element for processing. The forwarding element may include a proxy capable of intercepting protocol control information, encapsulating the protocol control information, and tunneling the encapsulated protocol control information to the control element for processing.

22 Claims, 6 Drawing Sheets

FORWARDING CONTROL PROTOCOL

TECHNICAL FIELD

This invention relates to networks.

BACKGROUND

Networks often rely on devices such as switches to receive packets of data from the network, determine where the packets need to go, and forward the packets accordingly. Switches must be able to communicate with other switches in the network to establish protocols (e.g., layer 2, L2 or data-link layer control protocols) regarding the forwarding of packets. The exchange of control protocols enables switches to determine where packets need to go and avoid forwarding loops in the network.

This communication is made possible by the exchange of special packets containing protocol control information. These special packets, called protocol data units (PDUs), tell the switches which forwarding state (e.g., listening, learning, forwarding) to maintain. In general, when a switch receives a PDU it must process the PDU using protocol software (such as Spanning Tree Protocol software) and then make corresponding configuration changes in the hardware. Thus, switches are typically required to perform not only routing lookup and forwarding in hardware, but also application-level proxy and network layer address translation.

DESCRIPTION

The separation of packet forwarding functionality and control functionality, as described below, can improve packet forwarding by independently processing control protocol information. Rather than supporting multiple protocols on a hardware-based packet processing device, L2 forwarding control protocols are offloaded to a software-based platform for processing. This offloading is accomplished without introducing forwarding loops or indefinite forwarding disruptions.

Figure 1:
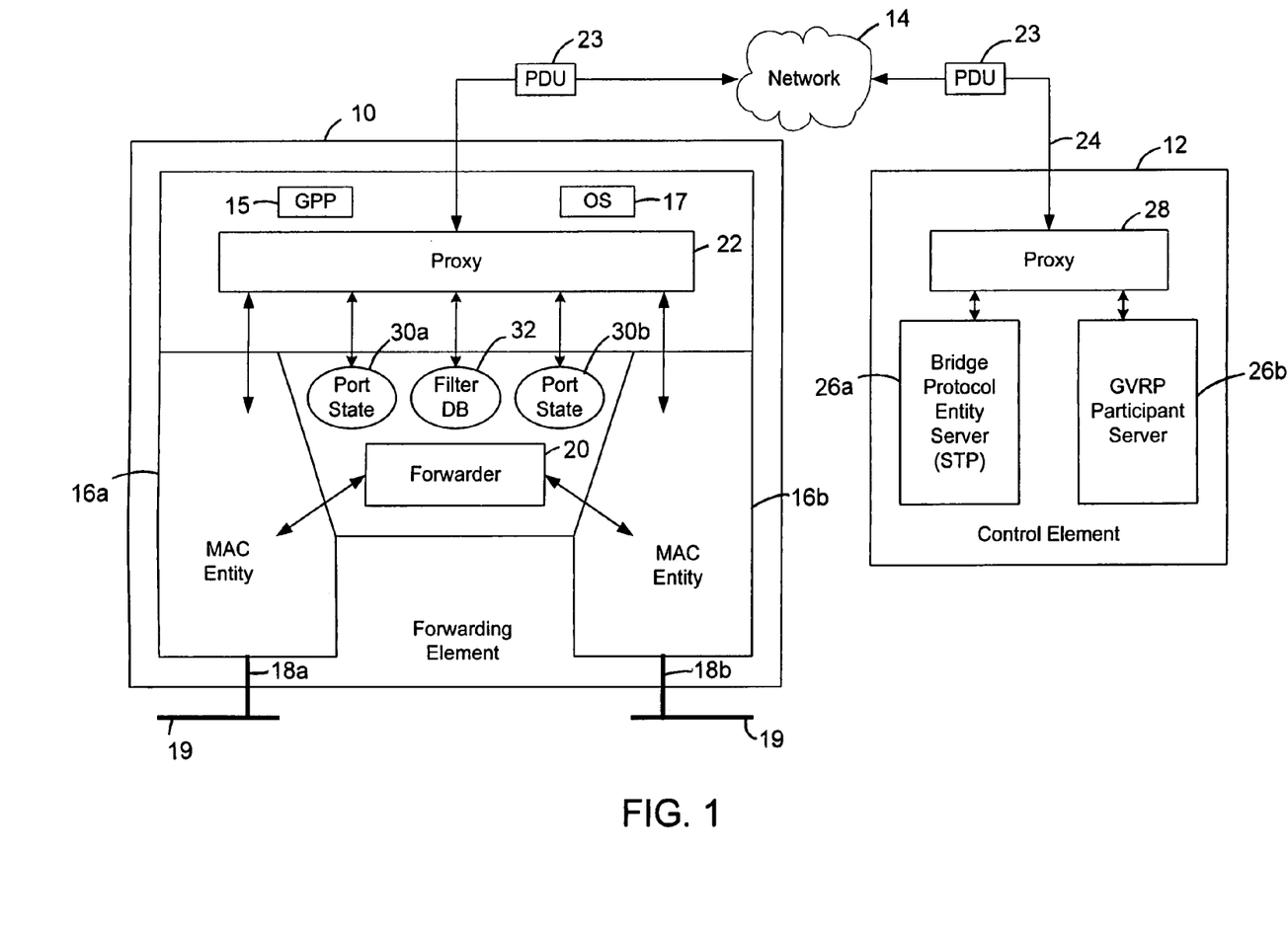
FIG. 1 is a diagram illustrating a forwarding element and a control element according to an embodiment of the present invention.

FIG. 1 illustrates a forwarding element 10 and a control element 12 communicating over a network 14 (e.g., a local area network). Forwarding element 10 is a dedicated hardware device for forwarding packets of information across a network. Forwarding element 10 includes dedicated hardware for packet forwarding, more than one network connection, a general purpose processor 15, and either a custom operating system or an embedded operating system 17 (e.g., VX Works®) capable of running software for forwarding control protocol information to control element 12. Control element 12 processes control protocol information for forwarding element 10 and transmits state changes and forwarding changes back to forwarding element 10. This processing of protocol control by control element 12 can be implemented using a personal computer with a connection to forwarding element 10.

Forwarding element 10 includes MAC (Media Access Control) entities 16a and 16b with network connections 18a and 18b for accessing a network (e.g., the Internet 19). Although only two MAC entities are shown, forwarding element 10 may contain numerous MAC entities with associated network connections. MAC entities 16a and 16b receive packets of information (e.g., packets that make up e-mail messages) from the network and read the MAC address contained in each packet. Each packet includes source and destination MAC addresses for directing packets to their final destination. Depending upon the MAC address of the packet, MAC entities 16a and 16b pass each incoming packet to either a forwarder 20 or a proxy 22 within forwarding element 10.

Most packets received by MAC entities 16a and 16b in forwarding element 10 require additional forwarding along the network. In this situation, forwarder 20 receives the packets from MAC entities 16a and 16b, determines which MAC entity (or port) to send it to, and forwards the packets accordingly. For example, forwarder 20 may receive a packet from MAC entity 16a, determine where the packet needs to go, and then forward the packet via MAC entity 16b.

When PDUs are received, MAC entities 16a and 16b recognize them based on their MAC addresses and pass them to proxy 22, instead of forwarder 20. Each PDU contains a unique MAC address that tells a switch that the packet is intended for the switch and not supposed to be forwarded. For instance, a spanning tree protocol mechanism (STP) may have its own MAC address and all PDUs for STP use that MAC address as the destination address.

Proxy 22 can be a proxy for a variety of protocols that deal with the forwarding of packets, including Spanning Tree Protocol (STP), Generic Attribute Registration Protocol (GARP), GARP Multicast Registration Protocol (GMRP), GARP Virtual Local-Area Network (VLAN) Registration Protocol (GVRP). STP, GARP, GMRP and GVRP are L2 protocols designed to establish L2 forwarding control. In particular, STP is used to eliminate forwarding loops within a L2 network, whereas GARP is a general protocol used by GMRP and GVRP to establish L2 multicast and VLAN forwarding domains, respectively.

Proxy 22 intercepts PDUs passed by MAC entities 16a and 16b and forwards them to control element 12 for processing. MAC entities 16a and 16b do not know that the protocol software (e.g., STP software) is not running on forwarding element 10 because MAC entities 16a and 16b exchange the same information with proxy 22 as they would with the protocol software. Thus, protocol control is offloaded to control element 12 rather then processing it on forwarding element 10. Because forwarding element 10 is able to offload forwarding control protocol processing, the hardware of forwarding element 10 does not have to support standard operating systems (e.g., Windows® NT or LINUX®) required to run the protocol software.

In order to forward the PDUs to control element 12, proxy 22 encapsulates each PDU within an L3 (layer 3 or network layer) packet and tunnels it to control element 12 via network 14 (e.g., local area network). Proxy 22 uses general purpose processor 15 and software to encapsulate and tunnel PDUs. Forwarding element 10 and control element 12 may also be connected by means of a serial connection, telephone wire, or a motherboard with a dedicated bus.

Control element 12 receives encapsulated PDUs 23 from forwarding element 10 and processes them. The functions of control element 12 may be performed by a personal computer having an operating system (e.g., Microsoft® Windows®, LINUX®), a network connection 24, protocol servers 26a and 26b and a proxy 28. Control element 12 contains multiple protocol servers, one for each protocol and one for each forwarding element. In other words, if control element 12 supports three forwarding elements 10 and two protocols, control element 12 would include six servers. Accordingly, control element 12 can support multiple forwarding elements because each forwarding element has a unique instance of the protocol software state machine and parser executing. Each server contains standard protocol software (e.g., STP, GARP, GVRP, GMRP) capable of processing PDUs. For example, as shown, Bridge Protocol Entity Server 26a is running Spanning Tree Protocol (STP) and GVRP Participant Server 26b is running GARP VLAN Registration Protocol (GVRP).

In order to process a PDU, proxy 28 receives the encapsulated PDU from forwarding element 10, removes the L3 encapsulation and directs the PDU to the appropriate protocol software running on protocol servers 26a and 26b. Protocol server 26a or 26b processes the PDU and returns any relevant configuration changes to proxy 28. Configuration changes may include state changes (e.g., listening, learning, forwarding) that must be updated within forwarding element 10 and responses that need to be forwarded to other forwarding elements (e.g., PDUs). When protocol servers 26a and 26b return configuration changes to proxy 22, the servers do not know that they are not communicating directly with forwarding element 10 because protocol servers 26a and 26b exchange the same information with proxy 28 as they would with forwarding element 10. Proxy 28 receives these configuration changes from protocol servers 26a and 26b, encapsulates them in an L3 packet and forwards the packets to forwarding element 10.

Proxy 22 on forwarding element 10 receives the encapsulated packets from control element 12 and removes the encapsulation using general purpose processor 15 and software. If necessary, proxy 22 updates forwarding databases 30a, 30b and 32 in the hardware of forwarding element 10. For example, state changes are made to forwarding databases 30a and 30b, whereas forwarding changes are made to filter database 32.

Figure 2:
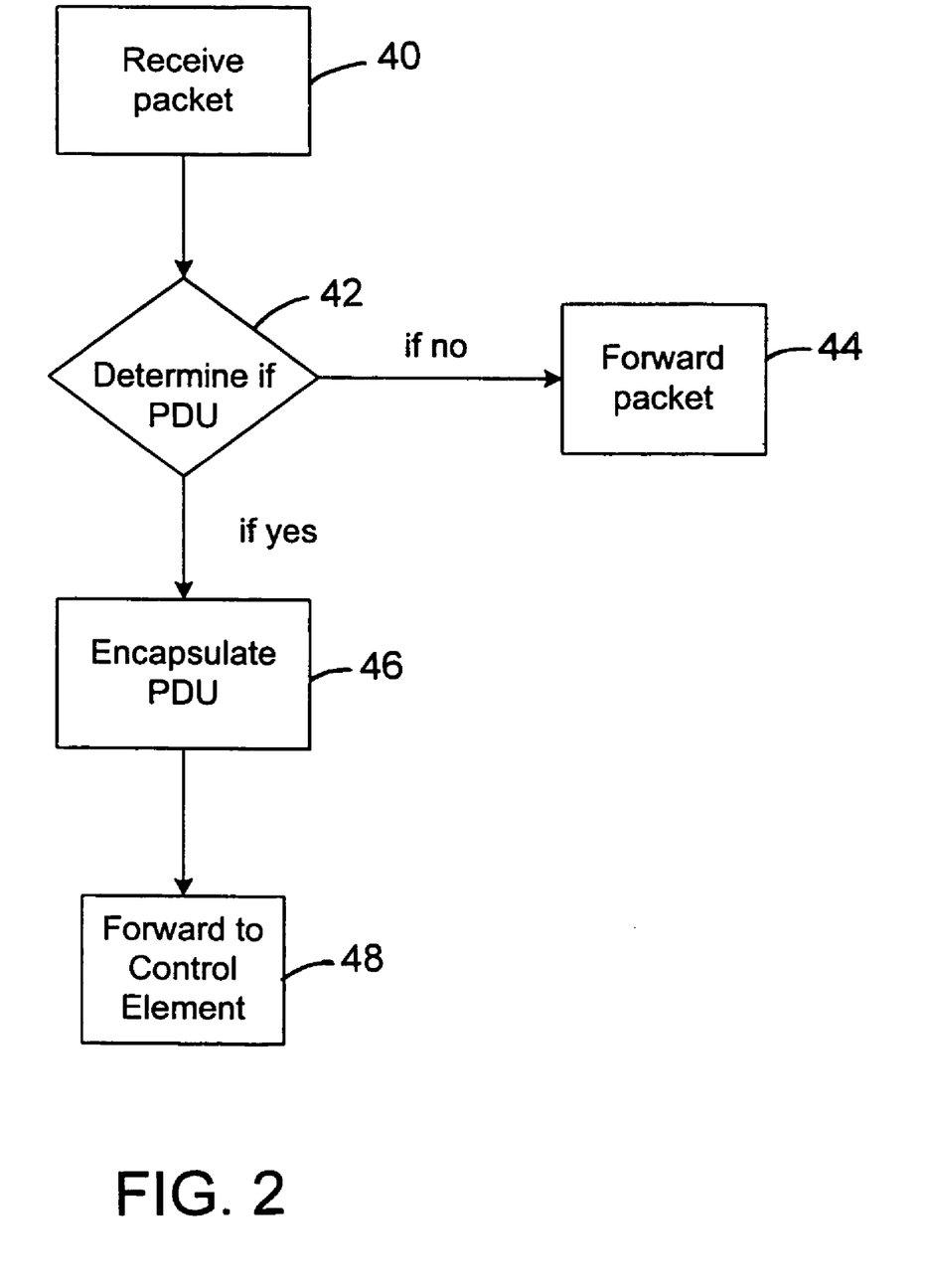
FIG. 2 is a flowchart of a process a forwarding element may use to forward protocol data to a control element according to an embodiment of the present invention.

As shown in FIG. 2, forwarding element 10 can receive 40 a packet and determine 42 whether the packet contains control protocol information (e.g., PDU) for forwarding element 10. If forwarding element 10 determines 42 that the packet does not contain control protocol information, then forwarding element 10 forwards 44 the packet. On the other hand, if forwarding element 10 determines that the packet contains control protocol information, forwarding element 10 first encapsulates 46 the packet and then forwards 48 the packet to the control element.

Figure 3:
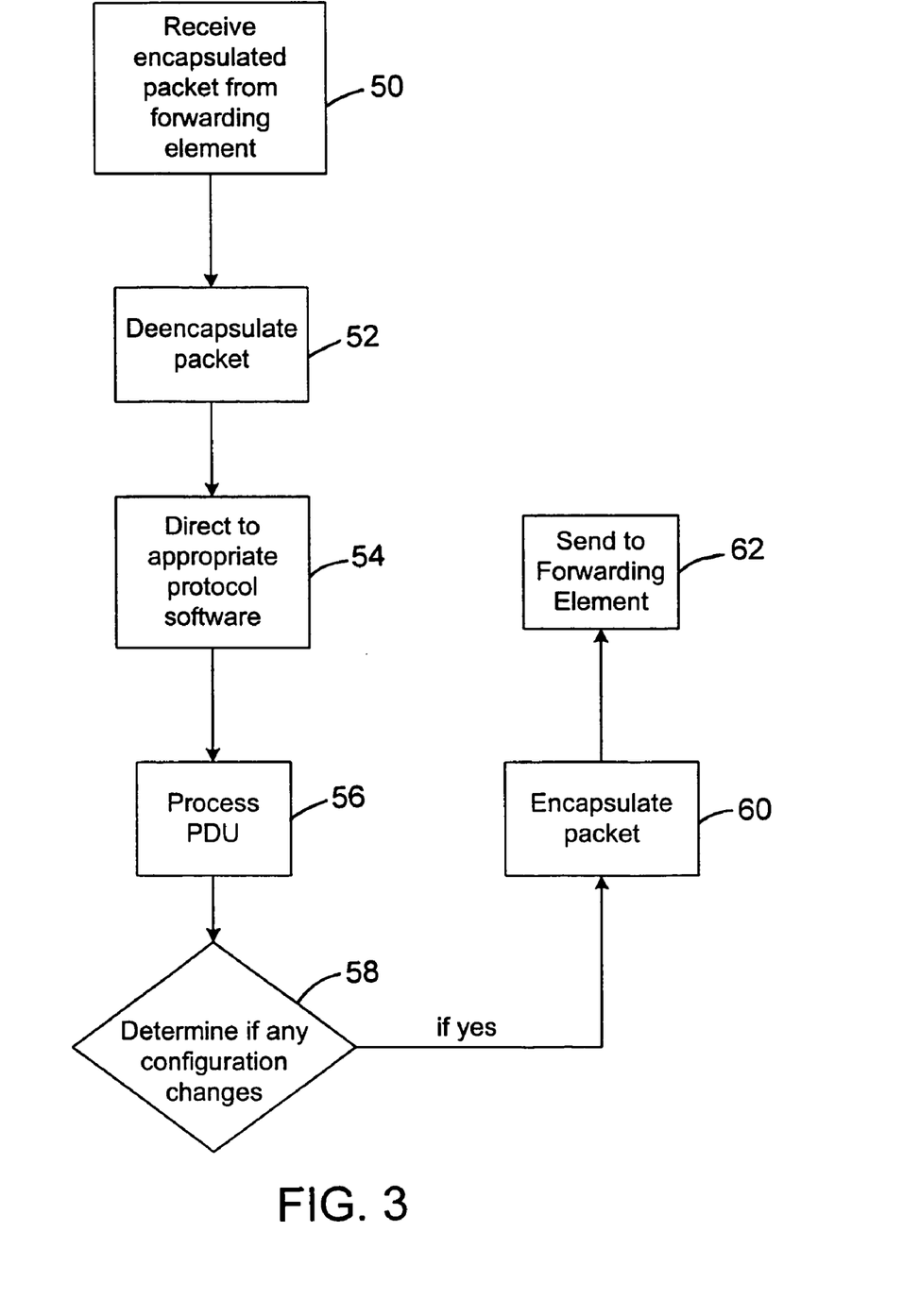
FIG. 3 is a flowchart of a process a control element may use to process protocol data received from a forwarding element according to an embodiment of the present invention.

Referring to FIG. 3, control element 12 can receive 50 an encapsulated packet from forwarding element 10. Upon receipt of a packet containing control protocol, control element 12 removes 52 the encapsulation and directs 54 the packet to the appropriate protocol server. The protocol software running on the protocol server processes 56 the packet and then control element 12 determines 58 whether any configuration changes have occurred. If control element 12 determines 58 that configuration changes have occurred, control element 12 encapsulates 60 the packet containing the configuration changes and tunnels 62 the packet back to forwarding element 10.

Figure 4:
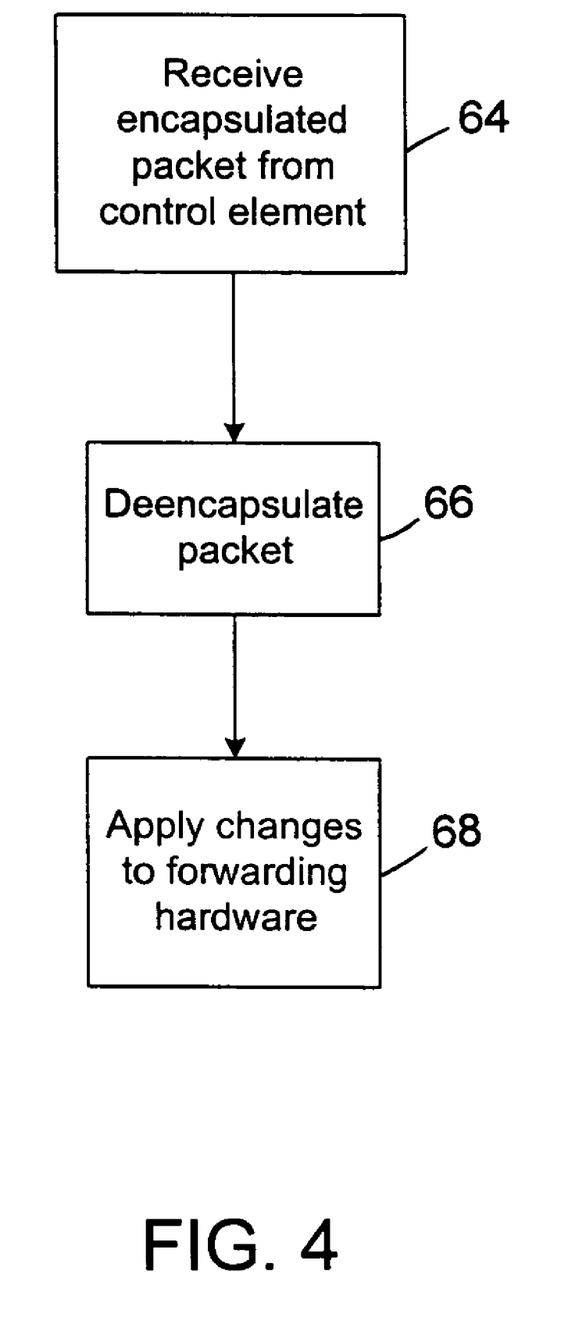
FIG. 4 is a flowchart of a process a forwarding element may use to process data received from a control element according to an embodiment of the present invention.

Referring to FIG. 4, forwarding element 10 can receive 64 an encapsulated packet containing configuration changes from the control element 12. Forwarding element 10 removes 66 the encapsulation and applies 68 the configuration changes.

Figure 5:
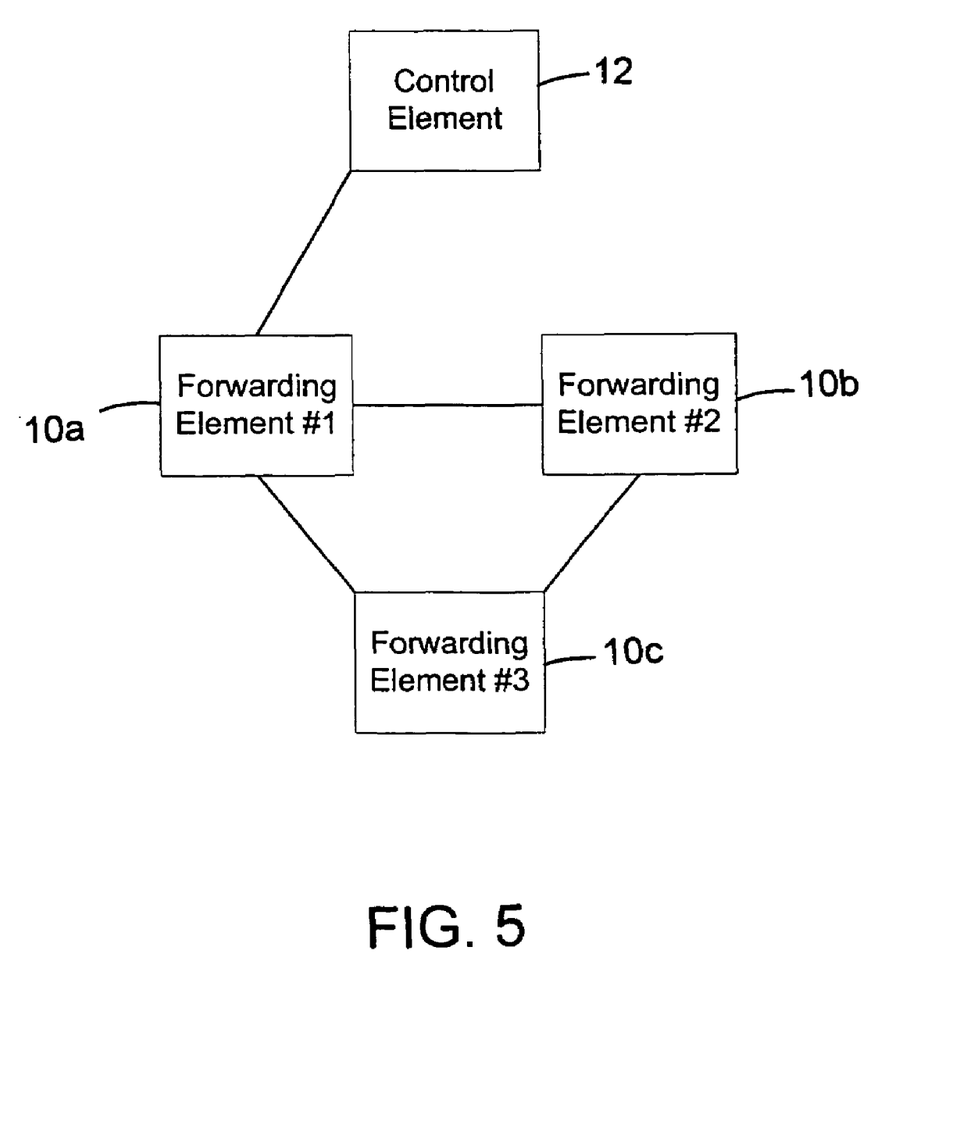
FIG. 5 is a diagram illustrating a control element and multiple forwarding elements according to an embodiment of the present invention.

FIG. 5 shows a control element 12 networked to forwarding elements 10a, 10b, and 10c. Control element 12 processes control protocol information for each of the forwarding elements, as discussed above. Because forwarding elements 1a, 10b, and 10c are not running protocol software (e.g., spanning tree protocol), the proper timing of communications between forwarding elements 10a, 10b and 10c and control element 12 needs to be established in order to avoid forwarding loops or indefinite forwarding disruptions.

Figure 6:
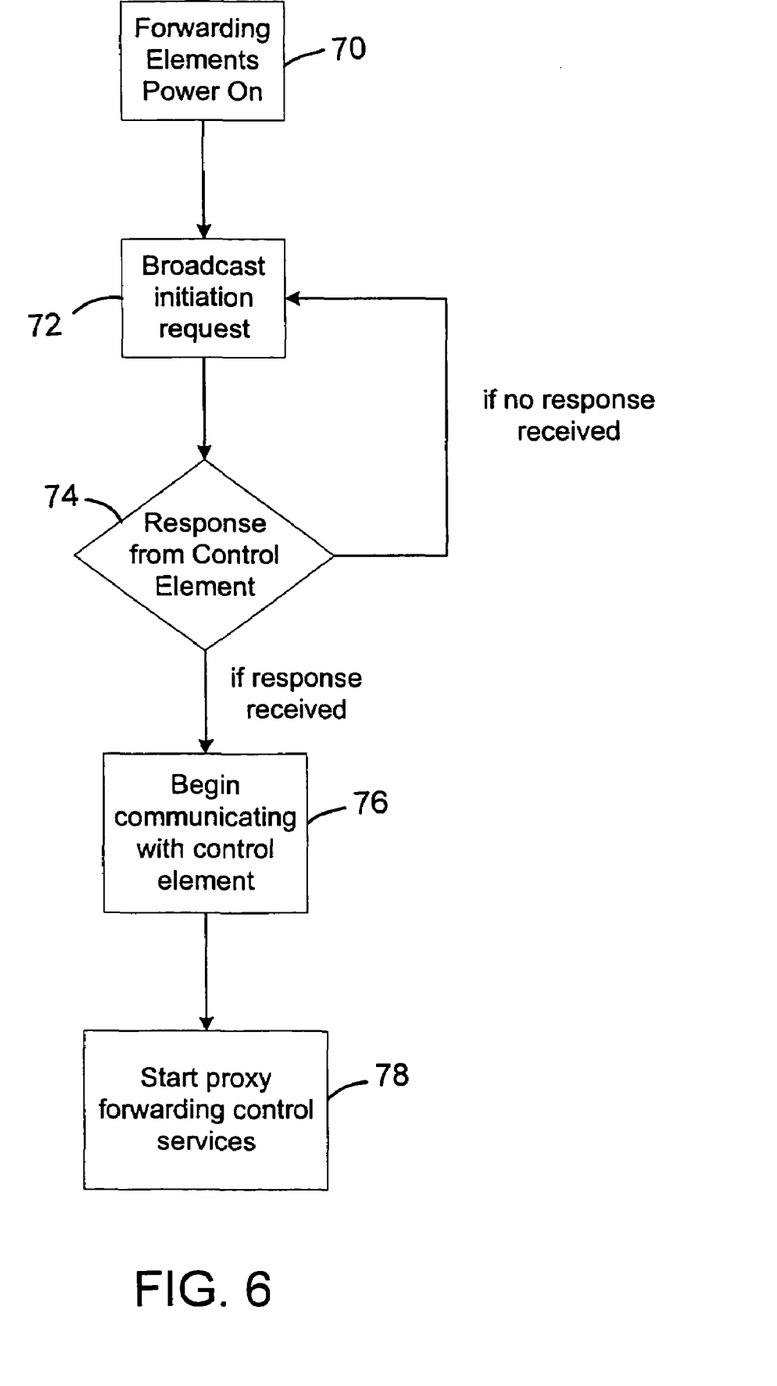
FIG. 6 is a flowchart of a process a control element and multiple forwarding elements may use to avoid forwarding loops according to an embodiment of the present invention.

Referring also to FIG. 6, when forwarding elements 10a, 10b and 10c power on 70 each forwarding element maintains a simple two-state finite-state machine. During state 1 (e.g., listening state), forwarding elements 10a, 10b and 10c cannot forward packets, including encapsulated PDUs, until STP forms a spanning tree. This prevents loops or any incorrect forwarding during the initiation sequence. After powering on 70, forwarding elements 10a, 10b and 10c start periodically broadcasting 72 initiation requests (e.g., BOOTP) in attempt to establish communication with control element 12. Once a forwarding element receives a response 74 from control element 12 to its initiation request, the forwarding element can move to state 2. In state 2, the forwarding element begins communicating 76 with control element 12 and starts 76 the proxy forwarding control services (e.g, STP, GVRP, GMRP).

With respect to FIG. 5, if forwarding element #1 (FE1) 10a, forwarding element #2 (FE2) 10b, and forwarding element #3 (FE3) 10c power on at the same time, all of the forwarding elements will begin generating initiation requests. The initiation requests from FE2 10b and FE3 10c will not reach control element 12 because FE1 10a will not be forwarding information. Thus, FE1 10a will be the first forwarding element to receive a response from control element 12 because FE1 10a is in direct contact with control element 12. Once FE1 10a receives a response to its initiation request, FE1 10a will begin running proxy STP, GVRP, and GMRP. In addition, FE1 10a will start forwarding packets, including the initiation requests from FE2 10b and FE3 10c. Eventually all forwarding elements will form a communication channel to control element 12 and will start proxy for forwarding control.

Other embodiments are within the scope of the following claims.

What is claimed is:

1. An apparatus comprising a forwarding element, the forwarding element configured to:
   receive a packet;
   determine whether the packet includes protocol control information;
   if the packet includes protocol control information, forward the protocol control information in an encapsulated form to a separate control element for processing, to receive, from the control element, a response that is based on the forwarded protocol control information, the response including protocol control information comprising configuration changes,
intercept protocol control information in the response, and
apply the configuration changes received in the response, wherein the configuration changes comprise state changes to be applied to the forwarding element and the state changes comprise changes to a state of the forwarding element, the state being selected from a group consisting of a listening state, a learning state, and a forwarding state.

2. The apparatus of claim 1, wherein the forwarding element includes a proxy configured to encapsulate the protocol control information.

3. The apparatus of claim 2, wherein the proxy is configured to tunnel the encapsulated protocol control information to the control element.

4. The apparatus of claim 1, wherein the forwarding element includes a proxy configured to act as a proxy for at least one of the following protocols: Spanning Tree Protocol, Generic Attribute Registration Protocol, GARP Multicast Registration Protocol and GARP VLAN Registration Protocol.

5. The apparatus of claim 1, wherein the protocol control information comprises a protocol data unit.

6. The apparatus of claim 1, wherein the forwarding element is configured to receive protocol control information in an encapsulated form from the control element.

7. The apparatus of claim 6, wherein the forwarding element includes a proxy configured to remove the encapsulation on the protocol control information from the control element.

8. The apparatus of claim 1, wherein the forwarding element is configured to apply the state changes received in the response.

9. The apparatus of claim 1, further comprising:
if the packet does not include protocol control information, forward the packet to a different forwarding element.

10. An apparatus comprising a forwarding element, the forwarding element configured to:
receive a packet;
determine whether the packet includes protocol control information;
if the packet includes protocol control information, forward the protocol control information across a communication network to a separate control element for processing; and
apply configuration changes to the forwarding element, the configuration changes received in a response from the control element based on the forwarded protocol control information, wherein the configuration changes comprise state changes to be applied to the forwarding element and the state changes comprise changes to a state of the forwarding element, the state being selected from a group consisting of a listening state, a learning state, and a forwarding state.

11. The apparatus of claim 10, wherein the forwarding element includes a proxy configured to intercept the protocol control information.

12. The apparatus of claim 11, wherein the proxy is configured to forward the protocol control information across a communication network to the control element.

13. The apparatus of claim 11, wherein the forwarding element is configured to receive protocol control information from the control element across a communication network.

14. An apparatus comprising:
a forwarding element configured to:
receive a packet,
determine whether the packet includes protocol control information;
if the packet includes protocol control information, forward the protocol control information received from a communication network and
a port configured to:
deliver the protocol control information to a communication link for transmission to a separate control element,
receive, from the control element, a response that is based on the forwarded protocol control information, the response including protocol control information comprising configuration changes; and
apply to the forwarding element the configuration changes included in the response from the control element, wherein the configuration changes comprise state changes to be applied to the forwarding element and the state changes comprise changes to a state of the forwarding element, the state being selected from a group consisting of a listening state, a learning state, and a forwarding state.

15. A method of forwarding protocol control information, comprising:
receiving protocol control information by a forwarding element;
encapsulating the protocol control information;
forwarding the encapsulated protocol control information to a control element for processing,
receiving, from the control element, a response that is based on the forwarded protocol control information, the response including protocol control information comprising configuration changes; and
applying configuration changes to the forwarding element, the configuration changes being received in the response from the control element, wherein the configuration changes comprise state changes to be applied to the forwarding element and the state changes comprise changes to a state of the forwarding element, the state being selected from a group consisting of a listening state, a learning state, and a forwarding state.

16. A method of forwarding protocol control information, comprising:
receiving protocol control information by a forwarding element, the protocol control information comprising configuration information;
forwarding the protocol control information across a network to a control element for processing; and
applying configuration changes received in a response from the control element to the forwarding element, the response being based on the forwarded protocol control information, wherein the configuration changes comprise state changes to be applied to the forwarding element and the state changes comprise changes to a state of the forwarding element, the state being selected from a group consisting of a listening state, a learning state, and a forwarding state.

17. A method of processing protocol control information, comprising:
receiving, at a separate control element, protocol control information in an encapsulated form from a forwarding element;
processing the protocol control information data in the control element; and forwarding a response that is based on the received protocol control information, the response including protocol control information comprising configuration changes to be applied to the forwarding element;

receiving, at the forwarding element, the response including the configuration changes; and applying the configuration changes to the forwarding element, wherein the configuration changes comprise state changes to be applied to the forwarding element and the state changes comprise changes to a state of the forwarding element, the state being selected from a group consisting of a listening state, a learning state, and a forwarding state.

18. A method of processing protocol control information, comprising:

receiving protocol control information via a communication network from a forwarding element by a separate control element;

processing the protocol control information in the control element;

forwarding a response back to the forwarding element via the communication network, the response based on the forwarded protocol control information, the response including protocol control information comprising configuration changes to be applied to the forwarding element, wherein the configuration changes comprise state changes to be applied to the forwarding element and the state changes comprise changes to a state of the forwarding element, the state being selected from a group consisting of a listening state, a learning state, and a forwarding state.

19. A system, comprising:

a forwarding element configured to:
  receive protocol control information,
  forward the protocol control information via a communication network to a control element, and
  apply configuration changes to the forwarding element, the configuration changes received in a response from the control element based on the forwarded protocol control information; and a control element configured to:
  receive protocol control information from the forwarding element,
  process the protocol control information, and
  forward the response that is based on the forwarded protocol control information, the response including protocol control information comprising configuration changes back to the forwarding element via the communication network, wherein the configuration changes comprise state changes to be applied to the forwarding element and the state changes comprise changes to a state of the forwarding element, the state being selected from a group consisting of a listening state, a learning state, and a forwarding state.

20. An article comprising a computer-readable medium which stores computer-executable instructions for forwarding and receiving protocol control information; the instructions causing a forwarding element to:

receive a packet, determine whether the packet includes protocol control information;

if the packet includes protocol control information, encapsulate the protocol control information in a level 3 packet;

tunnel the encapsulated protocol control information across a network;

receive a response that is based on the tunneled protocol control information, the response including protocol control information comprising configuration changes; and apply configuration changes to the forwarding element, the configuration changes being received in the response from a control element based on the tunneled protocol control information, wherein the configuration changes comprise state changes to be applied to the forwarding element and the state changes comprise changes to a state of the forwarding element, the state being selected from a group consisting of a listening state, a learning state, and a forwarding state.

21. An apparatus comprising a forwarding element, the forwarding element configured to:

receive a packet;

determine whether the packet includes protocol control information;

if the packet includes protocol control information, forward the protocol control information in an encapsulated form to a separate control element for processing, to receive, from the control element, a response that is based on the forwarded protocol control information, the response including a state change, intercept protocol control information in the response, and apply the state change received in the response, wherein the state change comprises a change in the state of the forwarding element, the state being selected from a group consisting of a listening state, a learning state, and a forwarding state.

22. The apparatus of claim 21, wherein the state change comprises a change to the operating status of the forwarding element.

* * * * *